Figure 1:
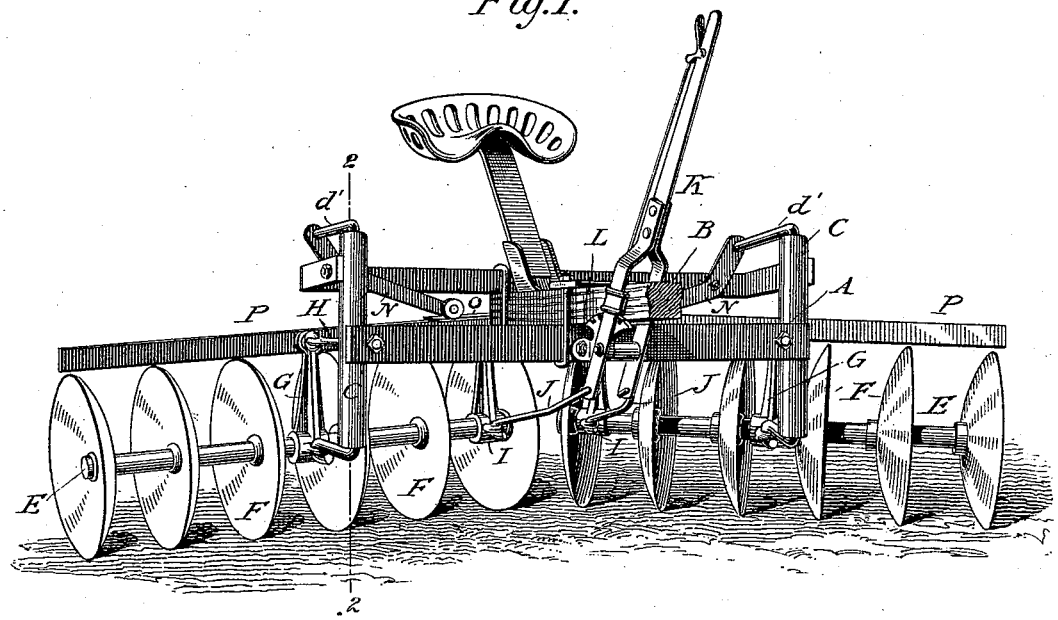

(No Model.)   2 Sheets—Sheet 1.

C. S. SHARP.
DISK HARROW.

No. 485,666.   Patented Nov. 8, 1892.

on line 2-2.

Witnesses
Raymond F. Barnes
W. R. Kennedy

Inventor
C. S. Sharp
By his Attorney
Phil. T. Dodge (No Model.) 2 Sheets—Sheet 2.

C. S. SHARP.
DISK HARROW.

No. 485,666. Patented Nov. 8, 1892.

Witnesses
Raymond T. Barnes.
W. R. Kennedy.

Inventor
C. S. Sharp
By his Attorney
Phil T. Dodge

UNITED STATES PATENT OFFICE.

CHARLES S. SHARP, OF AUBURN, NEW YORK, ASSIGNOR TO THE D. M. OSBORNE & COMPANY, OF NEW YORK.

DISK HARROW.

SPECIFICATION forming part of Letters Patent No. 485,666, dated November 8, 1892.

Application filed February 4, 1892. Serial No. 420,317. (No model.)

*To all whom it may concern:*

Be it known that I, CHARLES S. SHARP, of Auburn, county of Cayuga, and State of New York, have invented a new and useful Improvement in Disk Harrows, of which the following is a specification.

This invention has reference to that class of harrows in which two series of concave disks are mounted on shafts or axles standing in oblique relations to each other, the axles and disks commonly known as "gangs" being so mounted that their angular relations may be varied. These harrows are of two classes—those in which the gangs diverge in a forward direction and those in which they diverge in a rearward direction.

For many reasons unnecessary to detail there are great practical advantages attending the use of gangs which diverge in a forward direction and which present the concave sides of the disks outward, so that the resistance of the soil tends to crowd the two gangs inward endwise toward each other; but heretofore it has been found impossible to secure a proper operation of harrows of this class for the reason that the pressure or resistance of the soil crowding the gangs inward has a tendency to throw them upward out of the soil at the inner ends.

It is the aim of my invention to overcome this difficulty and produce a harrow of this type, the disks of which will run under all conditions at a uniform depth in the soil and without tendency to ride upward at either end. To this end I unite the two gangs with a draft-frame through swiveling connections and combine with the gangs devices through which the inward thrust or pressure is caused to apply a downward pressure on the inner ends of the gangs to prevent them from rising.

I believe myself to be the first to construct a disk harrow in which the lateral thrust or pressure of the disks is applied through instrumentalities of any kind to hold down the gangs at one end, and it will be understood by the skilled mechanic after reading this specification that the invention is susceptible of embodiment in many equivalent forms differing in detail.

In the drawings I have selected for the purposes of illustration the construction which I deem best adapted for general use.

Figure 2:
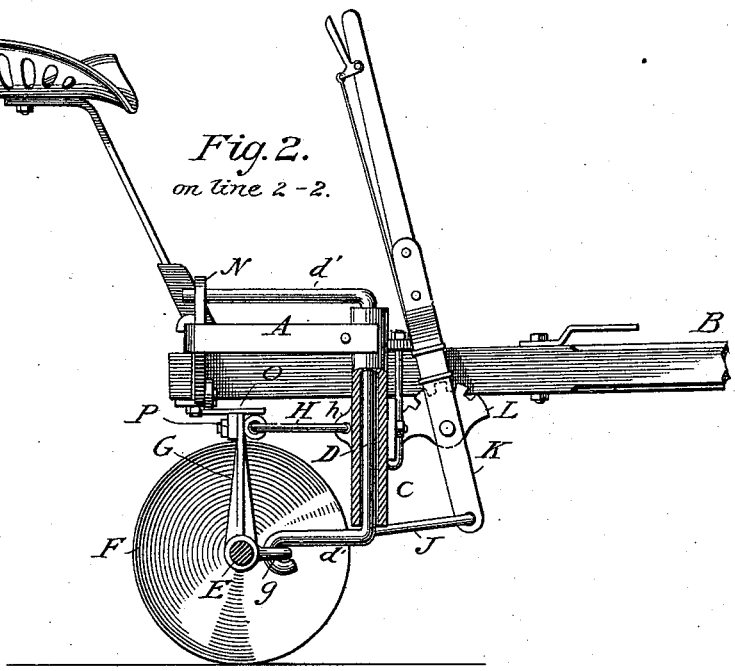
Figure 3:
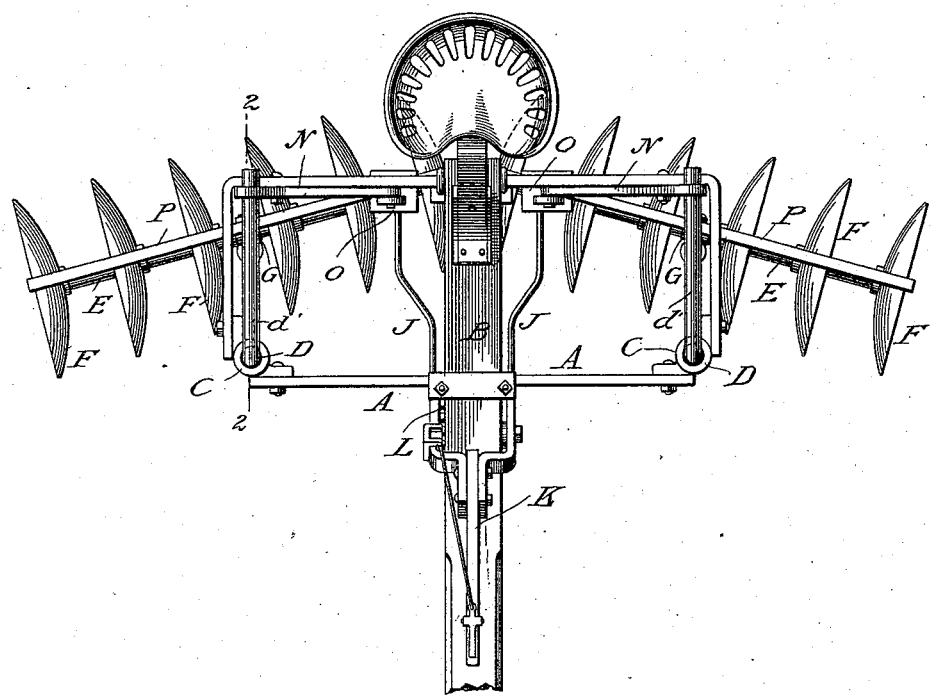
Figure 4:
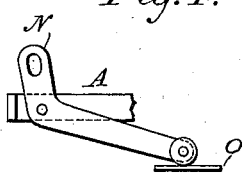

Figure 1 is a perspective view of my harrow, looking from the front or forward end, the draft pole or tongue being broken away. Fig. 2 is an end elevation of the harrow with portions shown in vertical section on the line 2 2 of Figs. 1 and 3. Fig. 3 is a top plan view of the harrow. Fig. 4 is a detail view illustrating the action of the equalizing or pressure levers.

Referring to the drawings, A represents a rigid rectangular frame securely attached to a draft pole or tongue B. The frame may be constructed of angular bars bolted together as represented in the drawings or in any other manner adapted to give support to the operative parts hereinafter described.

To the forward corners of the main frame there are firmly secured two vertical tubular boxes or sleeves C C, each giving support to the vertical shaft D, the upper and lower ends of which are turned rearward horizontally in parallel lines, so as to form in effect crank-arms $d'$ and $d'$.

E E represent two strong axles, each carrying a series of concave disks F, arranged at uniform distances apart. The two axles are arranged end to end and all the disks of each axle are faced in an outward direction. At or near its middle each axle extends through and turns freely in a bearing G, having immediately in front of the axle an eye or ear $g$, which receives the hooked rear end of the crank-arm $d'$ on the lower end of rock-shaft D. This arm $d'$ is in effect a draft-arm and is the principal means employed for carrying the gang forward. The axle-bearing G is extended upward and connected at its upper end by an eyebolt or equivalent jointed connection to a link H, which is extended forward and hooked or otherwise jointed to an ear $h$ on the vertical sleeve C.

It will be observed that the axle-box G is sustained and carried by the arm $d'$ and the link H, overlying the same, and that these connections, although carrying the gang forward in a positive manner, allow it freedom of motion in all directions—that is to say, they permit it, first, to rise and fall at either end;

second, to turn horizontally around the connection with the draft-arm d' and the link H, so that the axle may be placed in different angular relations to the line of travel, and, third, they permit the gang in consequence of the lateral motion of the draft-arm d' to shift bodily in an endwise direction.

In order to control the angular position of the gangs and to give the disks more or less obliquity in relation to the line of travel, I mount the inner end of each axle in a box or bearing I and connect these boxes of the respective axles by rods J to the lower end of a hand-lever K, pivoted to a bracket L, fixed to the main frame, so that by moving the lever the inner ends of the axles may be thrown forward or backward at will. The lever is provided with an ordinary latch or locking-dog arranged to engage the notched plate formed on the bracket L, as shown.

The parts described above constitute a complete and operative harrow; but in order to prevent the rising of the gangs at the inner ends I pivot to the ends of the main frame two angular levers N, the upper ends of which are slotted to receive the crank-arms on the upper ends of shafts D, while the lower ends are arranged to bear on plates O, carried at the inner end by the respective gangs. These plates are sustained by a bar P, bolted to the upper ends of the axle-bearings G and I. As the machine progresses the gangs are forced strongly inward in an endwise direction, carrying with them the boxes G, which swing the arms d' inward, thereby turning the shafts D, causing the arms at their upper ends to operate the levers N and apply to the inner ends of the gangs a downward pressure corresponding to the inward thrust of the gangs. The inward thrust has a tendency, it will be remembered, to cause the gangs to rise or climb out of the soil at the inner ends; but this tendency is counteracted or neutralized by the downward pressure, which bears at all times a due relation to the thrust.

It will be observed that in my harrow the draft is applied forward of the axles and on a level with the center of the axle. I find that by swinging the axle around a center forward of its own axis and by applying the draft on a level with the axle instead of below its center, as usual, I secure a smoother and more satisfactory action of the implement than is ordinarily obtained.

While I have represented my pressure devices arranged to act on the inner ends of the gangs having an inward thrust, it will be perceived that they may be applied in like manner to act upon and hold down the outer ends of gangs subject to an outward thrust.

The axle-boxes may each contain a series of balls, rollers, or other devices adapted to resist the end-thrust and reduce the friction.

Having thus described my invention, what I claim is—

1. In a disk harrow, the combination of a draft-frame, two disk gangs jointed thereto, and devices operated by the end-thrust of the gangs and acting to apply a downward pressure to the gang at one end.

2. In a disk harrow, a draft-frame, gangs connected thereto by laterally-swinging draft devices, so that the gangs may be moved endwise, and pressure devices operated by the end motion of the gangs and acting to hold the gangs down at one end.

3. In a disk harrow, the draft-frame, the forwardly-diverging gangs, their boxes, the upright shafts having crank-arms at their upper and lower ends, the lower arms connected with the axle-boxes, the levers N, connected with the upper crank-arms, and the bearing-plates carried by the gangs and acted upon by the levers, substantially as described and shown.

4. In a disk harrow, the combination of a draft-frame, an axle provided with a series of disks, a box on the axle, a vertical shaft mounted in the frame and having crank-arms at both ends, a direct connection between the lower crank-arm and the axle-box, and a lever connection between the upper crank-arm and the end of the axle, whereby pressure is applied by the longitudinal movement of the axle.

5. The combination of the draft-frame, the axles, and rotatable disks, boxes for the axles, vertical crank-shafts mounted in the frame and having their crank-arms connected directly to the axle-boxes, and means for controlling the angular relation of the axles, substantially as shown and described.

In testimony whereof I hereunto set my hand, this 26th day of January, 1892, in the presence of two attesting witnesses.

CHARLES S. SHARP.

Witnesses:
C. E. ALMY,
M. J. LOWER.